April 5, 1966   R. F. PULFER   3,244,085
BOREHOLE OR PIPE CAMERA
Filed Aug. 16, 1963   3 Sheets-Sheet 1

INVENTOR
Robert F. Pulfer
By Watson, Cole, Grindle & Watson
ATTORNEYS

April 5, 1966 R. F. PULFER 3,244,085
BOREHOLE OR PIPE CAMERA

Filed Aug. 16, 1963 3 Sheets-Sheet 2

INVENTOR
Robert F. Pulfer
By Watson, Cole, Grindle & Watson
ATTORNEYS

April 5, 1966  R. F. PULFER  3,244,085
BOREHOLE OR PIPE CAMERA

Filed Aug. 16, 1963  3 Sheets-Sheet 3

INVENTOR
Robert F. Pulfer
By *Watson, Cole, Grindle & Watson*
ATTORNEYS

United States Patent Office 3,244,085
Patented Apr. 5, 1966

3,244,085
BOREHOLE OR PIPE CAMERA
Robert Frederick Pulfer, Redland, Bristol, England, assignor to Central Electricity Generating Board, London, England, a corporation of Great Britain
Filed Aug. 16, 1963, Ser. No. 302,637
Claims priority, application Great Britain, Aug. 17, 1962, 31,728/62
5 Claims. (Cl. 95—11)

This invention relates to cameras which are suitable for performing a process of testing pipes. The invention is particularly applicable to the inspection of pipes of large boilers of the kind which are used in power stations and will primarily be described in this specification in relation to this use although it will be appreciated that the invention has application in the inspection of other pipes.

During the erection of a large boiler the boiler pipes are welded together and in some cases substantial weld penetration occurs. Other faults such as cracking or pitting may possibly occur and during the course of erection foreign bodies may get into the tubes and foreign substances may be deposited on the internal surfaces of the tubes. As boiler tubes are of small diameter, usually being less than about four inches in diameter, it is not possible to inspect the interior surfaces of the tubes directly, and if faults are known to be present it is frequently impossible to locate the faults precisely and it is, therefore, necessary to cut out a considerable length of tube and replace it to ensure that the fault has been rectified.

According to one aspect of the present invention a process of testing pipes comprises viewing the interior surface of the pipe by a camera conveyed through the pipe with the axis of the lens of the camera coincident or parallel with the longitudinal axis of the pipe and illuminating the interior surface of the pipe by means moving in conjunction with the camera and so arranged that any part of the interior wall surface of the pipe within the effective field of view of the camera is illuminated substantially exclusively from an annular light source collectively defined by a ring of lights 59 concentric to the lens axis and directing light at an angle of less than 45° to said axis and to the surface of the said part. Although an angle of 45° is mentioned, the angle is preferably less than 20° and the preferred range is below 15°. The effect of lighting the interior surface of the pipe with light in this way, which for convenience will be termed shallow angle lighting hereafter, is to cast substantial shadows where irregularities in the surface of the pipe occur. To explain the requirements of the lighting reference will be made to FIGURE 1 which is a diagrammatic longitudinal section through a pipe containing a camera.

FIGURE 1 shows a pipe 1 containing a camera 2 having at its lower end a wide angle lens with a field of view of 50°, the field of view being bounded by the dotted lines 3 and 4. The camera carries lighting means consisting of a ring of electric lamp bulbs collectively defines an annular light source concentric to the lens axis with each bulb or light 59 arranged in a longitudinally extending tunnel the forward ends of which open on a conical end wall 5 of the camera. Lighting means of this kind will be described in more detail with reference to a particular embodiment below.

The pipe 1 consists of two sections which are connected by a weld 6. At a point on the right-hand side of FIGURE 1 the weld has penetrated into the interior of the pipe to produce a ridge. It will be seen that a light ray $a$ from the bulb which is positioned on the same side of the lens axis as the weld peneration and passing immediately above the crest of the ridge of weld metal strikes the interior surface of the pipe at a point $b$. Accordingly, there is a region of shadow $c$ formed behind the weld penetration and this shadow will appear on the picture viewed by the camera. The pipe 1 also contains a crack or pit $d$ and it will be seen that the light ray $e$ from the nearest lamp bulb on the same side of the lens axis as the pit and just passing over the near edge $f$ of the pit will strike the interior surface of the pipe at a point $g$ and will leave the region between the points $f$ and $g$ in shadow and this shadow will appear in the picture viewed by the camera. This shallow angle lighting which produces shadows at or behind any irregularities in the interior wall surface is an essential feature of the present invention. In order that minor irregularities can be viewed, the angle of lighting should be as shallow as possible consistent with reasonable illumination of the non-shadowed parts and a reasonable length of shadow which will not obscure other irregularities. Preferably the angle of illumination $h$ at the near boundary of the field of view of the camera (where the dotted line 4 meets the interior wall of the pipe) should not exceed 15°. In other words, the angle in which the outer boundary of the forwardly projected conical light pattern diverges from the axis of the lens is preferably less than 15 degrees, though it may be at a greater angle up to but not exceeding 45 degrees.

In order to produce sharp shadows it is essential that any part of the tube shall be illuminated substantially by a light source positioned on the same side of the lens axis as the said part. Thus the light should be guided or shielded in such a way that light from a source cannot cross the axis of the pipe on to the side wall of the pipe opposite to the light source. Such an undesirable ray is shown by the chain dotted line $k$. It is also important to avoid illumination of a part of the pipe surface by light reflected from the part of the pipe surface which is diametrically opposite and accordingly the light should be guided or shielded in such a way as to avoid rays such as that shown by the chain dotted line $m$. Of course, the scattering of light from the sidewalls of the pipe cannot be entirely prevented but by using shallow angle lighting it is minimised. It may be seen by reference to FIGURES 1 and 3 that the forward end of the cover D, which in this instance is defined by the light housing C, projects axially forwardly of the annular light source and is interposed radially between the light source and the lens in such a manner as to prevent rays of light from the annular light source from crossing the lens axis. It will be understood, of course, that the housing C is formed of opaque material as indicated in the drawings.

It will be appreciated that although it is far more convenient to have the light source in the vicinity of the lens with the light shining forwardly along the pipe with respect to the camera it is also possible to have the light source carried by the camera some way ahead of the lens and shining backwardly towards the camera so long as guide means or shield means are provided to prevent light shining directly into the lens and to prevent light rays crossing the axis of the tube in the manner of the light rays $k$ and $e$.

Although the process is largely applicable to the testing of boiler pipes during construction of the boiler to control such things as the welding of the pipes and the exclusion of foreign bodies, it will be clear that the process can be used for the examination of pipes already in service and in this respect the process may be used for examinations for corrosion.

Although the process is primarily applicable to the use of a photographic camera it may also be used in conjunction with a television camera. When a photographic camera taking single exposures is used the camera is stopped at spaced locations along the length of the tube and an exposure made at each location. The camera may be provided with a shutter but preferably operation of the illuminating means is used to control the duration of the exposure. Thus for each exposure the light source may be switched on for a brief period, which in practice may vary from a fraction of a second to 15 or 30 seconds.

According to another aspect of the present invention a camera comprises an elongated body, a lens at one end of the body, means connected to the other end for conveying the camera through the pipe, and illuminating means carried by the camera and arranged so that when the camera is positioned within a pipe any part of the interior wall surface of the pipe within the effective field of view of the camera is illuminated substantially exclusively from a light source displaced laterally from the lens axis on the same side of the lens as the said part and directing light at an angle of less than 45° to the surface of the said part.

The invention may be performed in various ways and one particular embodiment with a number of modifications will now be described by way of example with reference to the accompanying drawings in which.

Figure 2:
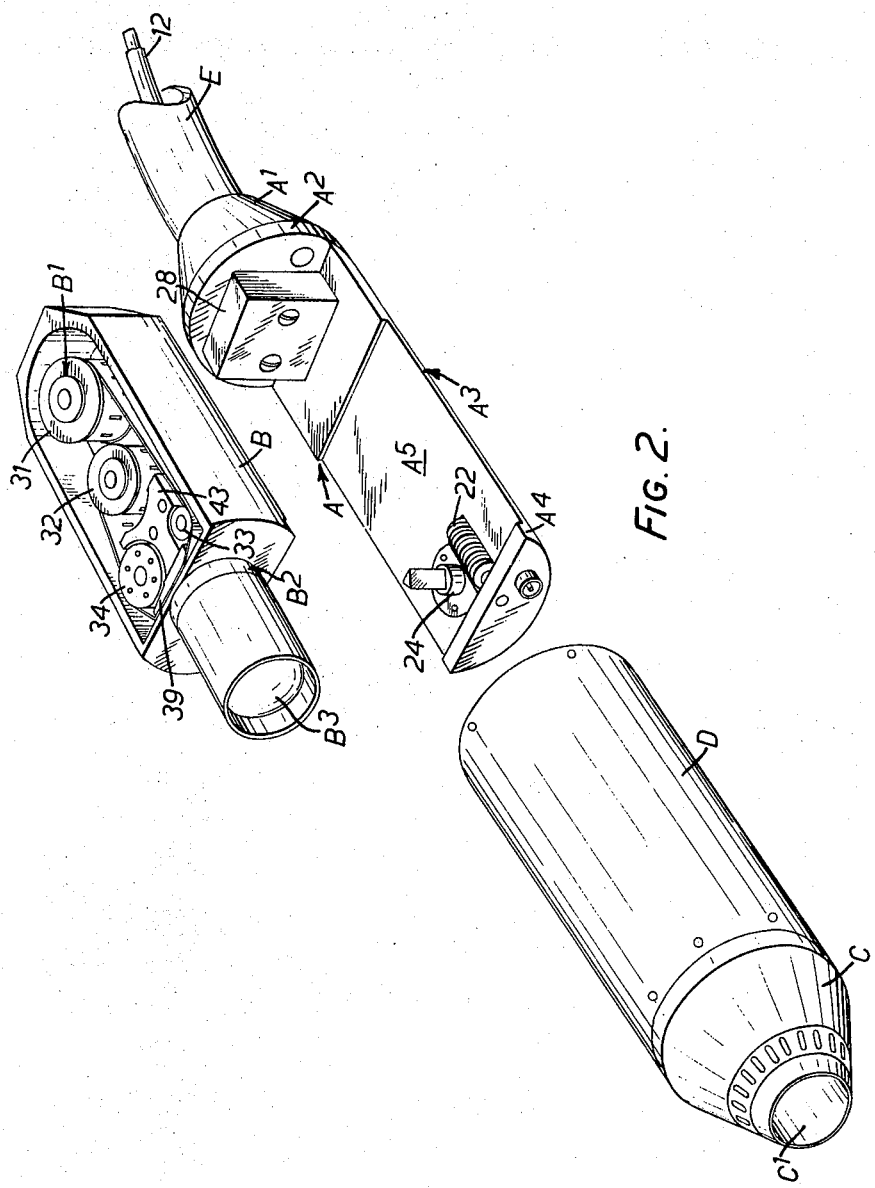
FIGURE 2 is an exploded diagrammatic view of a camera.

Referring now to FIGURE 2 of the drawings it will be seen that the camera consists of three main parts, namely a camera body A, a cassette B (from which the lid has been omitted in FIGURE 2) and a light housing C carrying an outer cover D.

The camera body A includes an end section having a portion $A^1$ generally in the form of a truncated cone and a short cylindrical portion $A^2$ extending from the cone portion. A flexible conduit E extends from the small end of the cone. Projecting from the cylindrical portion $A^2$ is the major body section $A^3$ which comprises a minor segment of the projection of the short cylindrical portion $A^2$. The major body section is thus bounded by a curved surface $A^4$ forming less than half of the cylinder and a plane surface $A^5$.

The cassette B includes film winding means $B^1$ and a lens holder $B^2$ for carrying a wide angle lens $B^3$. The cassette fits against the plane surface $A^5$ of the body section. The light housing C accommodates a ring of lights and carries the outer cover D which fits over the body section $A^3$ and the cassette B, the lens being contained in a bore $C^1$ extending through the light housing.

The camera will now be described in more detail with reference to FIGURES 3 and 4.

The short cylindrical portion $A^2$ of the body carries a rotary shaft 10 whose longitudinal axis is parallel with the longitudinal axis of the camera. This shaft has a square bore in its free end which accommodates the square end 11 of the core of a flexible drive 12 which is contained in the flexible conduit E. Two or three feet behind the camera there is a motor housing 13 containing an electric motor which drives the flexible drive 12. The end of the motor housing 13 remote from the camera is connected to a flexible conduit F of similar construction to that of the conduit E and of a length of approximately 100 feet. This flexible conduit carries colour-coded markings at intervals of one foot and has sufficient torsional rigidity to enable the camera to be "screwed" out if it becomes jammed in a tube. The flexible conduits E and F also accommodate a multi-strand copper earth and safety wire 14, a multi-core electrical control cable 15 and two steel suspension cables 16 which take the weight of the camera and reduce the tensile load on the flexible conduits. The shaft 10 has a large gear wheel 17 and a small gear wheel 18 fixed to it. The large gear wheel 17 meshes with a small gear wheel 19 fixed to a shaft 21 which is mounted in a bore extending the length of the main body section $A^3$. The forward end of the shaft 21 carries a worm 22 which, as can be seen from FIGURE 4, drives a worm wheel 23 on a shaft 24 which projects upwardly out of the flat surface $A^5$ of the main body section. The small gear wheel 18 on the shaft 10 meshes with a large gear wheel 25 fixed to a sleeve 26 which surrounds the shaft 21 and is rotatable relative thereto. The sleeve 26 carries a cam 27 which is arranged to operate the switch member of a micro-switch 28, the function of which will be explained below.

The cassette B consists broadly of an open topped, shallow, generally rectangular box, which can be closed by a flat lid 30. Mounted on shafts projecting from the bottom wall of the cassette are a film supply spool 31 and a film take-up spool 32. The film passes from the film supply spool 31 around a roller 33, across the front end of the box, around a sprocket roller 34 and on to the take-up spool 32. The sprocket roller 34 is mounted on bearings on the bottom wall of the cassette and has a hollow spindle 35 the bore of which is of non-circular cross section and is in line with an aperture 36 in the bottom wall of the cassette. When the cassette is positioned on the camera body A the shaft 24 extends through the aperture 36 into the bore of the spindle 35. The upper end of the shaft 24 has a non-circular cross section corresponding to the bore of the spindle 35 so that the sprocket roller is placed in driving connection with the shaft 24 and hence with the motor 13. The sprocket roller 34 has fixed to it a gear wheel 37 which rotates in a recess in the bottom wall of the cassette and drives the take-up spool 32 through intermediate gearing not shown. The supply spool 31 is provided with friction means (not shown) which resist its rotation so that the film is held taut when the take-up spool 32 rotates to draw film from the supply spool 31.

Between the roller 33 and the sprocket roller 34 the film runs behind the inner end of a circular aperture 38 extending through the adjacent end wall of the cassette. The film is held tight up against the end wall of the cassette by a pressure pad 39 which is mounted on one end of a plunger 41 which can reciprocate in a bore 42 in a block 43 mounted on the bottom wall of the cassette between the roller 33 and the sprocket roller 34. A compression spring 44 surrounds the plunger 41 and biases the pressure pad towards the end wall of the cassette.

Fixed to the outer surface of the end wall of the cassette is the lens mounting $B^2$ which surrounds the aperture 38 and in which is mounted a suitable lens which is preferably of short focal length. As an example, the lens may be a wide angle 8 mm. cine lens, focal length 6.5 mm. F/2.5 with fixed stops which may be changed.

The open top of the cassette is closed by the flat lid 30 which carries a spring loaded ball 51 projecting from its under surface, the ball co-operating with depressions 52 which are evenly spaced around a pitch circle on the upper surface of the sprocket roller 34 and which permit the film to be index forward by equal increments determined by the spacing of the depressions.

The outer tubular cover D consists of a cylinder which can be slid over the cassette B and the major body section $A^3$ and secured at one end to the short cylindrical portion $A^2$ of the camera body by means of screws 53. An O-ring 54 is provided to prevent the entry of dust to the camera between the outer cover and the cylindrical portion $A^2$. The other end of the outer cover includes a portion C which functions as a light housing C and which is connected to the cover proper by screws 55.

Figure 3:
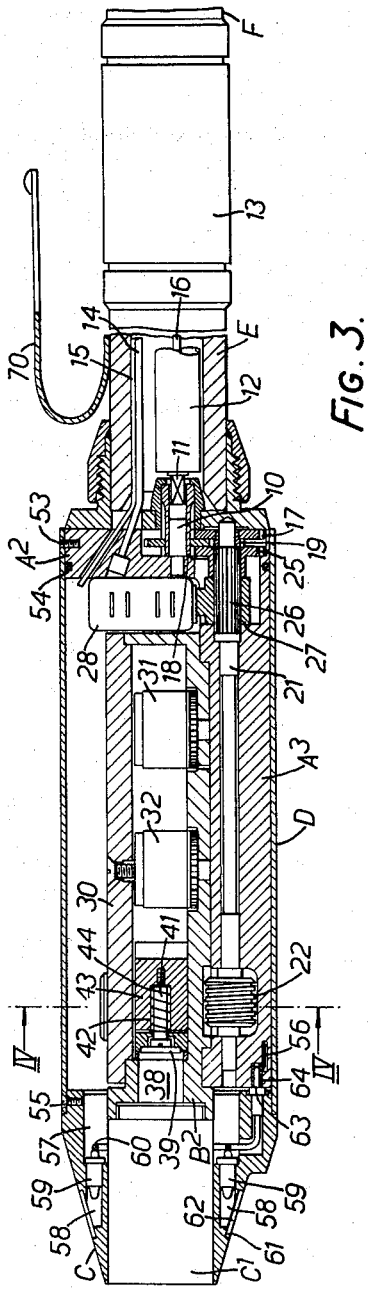
FIGURE 3 is a longitudinal section through the camera shown in FIGURE 2.
Figure 4:
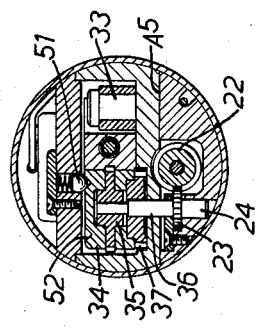
FIGURE 4 is a cross-section on the line IV—IV of FIGURE 3.

The light housing consists of a generally conical member of opaque material having the cylindrical bore $C^1$ extending coaxially through the coincidentally to the lens axis, bore $C^1$ accommodating the lens mounting $B^2$ and the lens (not shown in FIGURE 3). Concentric with the bore $C^2$ is a counterbore 57 from which extend eighteen drillings 58 which are parallel to the axis of the bore $C^1$. Each drilling accommodates a small electric bulb 59 which, in the particular instance being described, is a 15 volt ¾ watt bulb. The drillings 58 terminate in a groove 61 formed around the conical wall of the light housing and containing a strip 62 of transparent plastic material. The bulbs 59 are connected by a wire 60 to a pin 63 which extends rearwardly from the rear wall of the light housing. The forward end of the main body portion A⁵ of the body section is provided with a socket 64 adapted to receive the pin 63 when the light housing is passed over the lens B³. The socket 64 is electrically connected to the control cable 15 by a wire 56.

The camera is used as follows. The cassette is loaded with film, usually of width approximately 9.5 mm. in a dark room and is transported to the site with a plug fixed in the lens holder B². The appropriate lens is chosen on site and fixed to the cassette in a dim light. The light housing C and the outer cover D fixed thereto are removed from the camera body A and the cassette B is positioned on the body with the non-circular drive shaft 24 extending into the corresponding non-circular bore in the spindle 35 of the sprocket roller 34. The outer cover and light housing may then be replaced thus securing the cassette. The camera is then entered into the upper end of the tube to be examined and lowered to the bottom of the region of the tube to be examined.

By reason of the shape of the camera and its general arrangement the camera is able to pass round gentle curves in the tube if these are present. It will be noticed from an examination of FIGURE 3 that the common axis of the bore C¹ and of the lens B³ is slightly offset from the axis of the outer cover D. The flexible conduit E carries a U-shaped spring bracket 70 which engages the adjacent wall of the tube and presses the opposite side of the camera against the opposite wall of the tube leaving a small gap between the adjacent wall of the tube and the camera. This positions the axis of the lens on the longitudinal axis of the tube.

Figure 1:
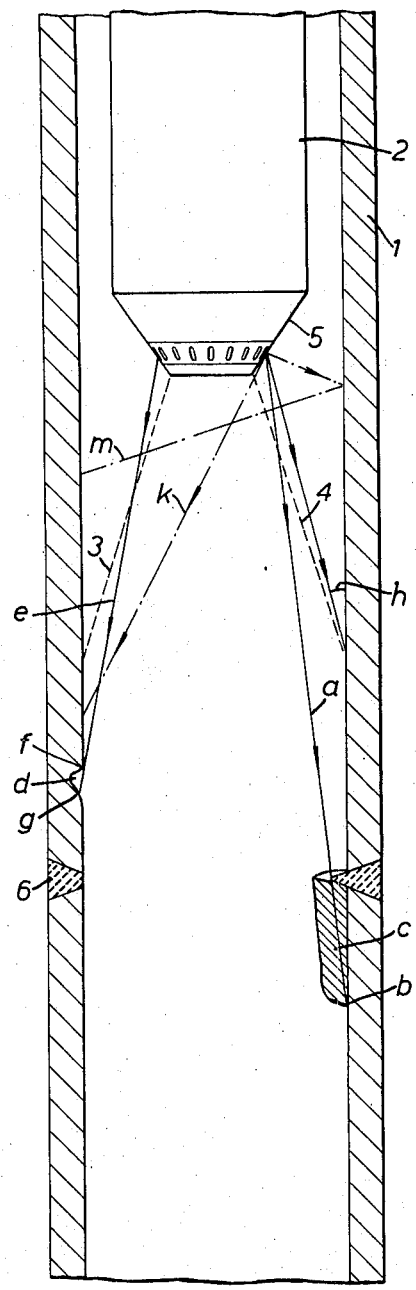
FIG. 1 is a diagrammatic longitudinal section through a pipe containing a camera according to my invention.

The upper end of the control cable 14 is connected outside the tube to a control box which contains various electrical components and whose construction forms no part of this invention. Various possible constructions of the control box will be apparent to those familiar with the art. When the camera is positioned at the point at which the first exposure is to be made a switch on the control box is closed and this causes current to flow from a power source outside the tube down the control cable and through the micro-switch 28 to the motor 13 to operate the motor. The motor drives the flexible drive 12 and thus drives the sprocket roller 34 and the take-up spool 32 to move the film on. When the film has been moved on by the distance corresponding to one exposure the cam 27 will operate the micro-switch 28 to cut off the electricity supply to the motor and to cause the control box to illuminate the lamps 59 for a predetermined period of time set by adjusting means on the control box. The lamps 59 will illuminate the interior wall surface of the pipe at a shallow angle in the manner described with reference to FIGURE 1 and the film will be exposed. The camera is then drawn up by an increment of between one and three tube diameters and the process is repeated, a further exposure being made. The camera is progressively raised by equal increments, an exposure being made after each movement. In this way a record of the complete length of the tube may be obtained.

With a camera having an overall length of about six inches and a diameter of 1½" a capacity of at least 400 pictures may be obtained. Such a camera will produce in a tube of 2" internal diameter a picture of the tube wall starting at a point about 2" in front of the camera and giving a reasonable picture up to about 9" from the camera. By the spacing of successive pictures at about 6" some overlap will be obtained.

Various modifications of the construction described may be made and a number of these will now be briefly described.

Instead of placing the lamps near the forward end of the camera they can be placed further back and mirrors or light guides used to guide the light so that it is projected forwardly to illuminate the tube in the same manner as the bulbs of the embodiment described. Instead of electric lamp bulbs a xenon source may be positioned at the rear end of the camera and light transmitted to the forward end by a ring of longitudinally extending bundles of glass fibres.

In a camera used for a slightly larger diameter of tube than those for which the camera described above is intended it is possible to dispense with the separate electric motor housing 13 and position the motor in the camera body. In another embodiment a solenoid is employed instead of a motor. The armature is connected to a rack cooperating with a pinion which drives the sprocket and film take-up spool. A unidirectional drive is incorporated in the transmission between the rack and the sprocket so that as the armature reciprocates the sprocket will rotate in one direction.

What I claim as my invention and desire to secure by Letters Patent is:

1. A camera for the inspection of the inside wall of a pipe comprising an elongated tubular body open at one end, a lens within the said body displaced axially from said open end, an annular light source around the axis of the lens for projecting light forwardly of the lens beyond said open end, said body including opaque means extending forwardly of the light source between the light source and the axis of the lens to prevent light from the source from crossing the axis of the lens, and means associated with said light source for confining the forwardly projected light thereof to a forwardly projected pattern diverging from the axis of the lens at an angle less than 45 degrees, wind-off and wind-on spools for photographic film housed within said elongated body in operative relationship to said lens, a motor housing supported at the other end of said body in alignment therewith and of substantially smaller transverse cross section than said elongated body, whereby to facilitate the movement of said body and said housing around bends in the pipe, an electric motor in said housing, means in said body for driving said wind-on spool, and a flexible drive transmitting element operatively connecting said electric motor to said means, means being connected to said camera for urging the same through the pipe.

2. A camera as defined in claim 1, in which the forward open end of said tubular body defines a viewing aperture for the lens concentric to the axis of said lens, said aperture being spaced axially forwardly of the lens and of sufficiently small diameter as to restrict the field of view from said lens through the aperture to a forwardly divering angle of less than 45 degrees.

3. A camera as defined in claim 2, in which the said angle at which said light diverges relative to the said lens axis is less than 15 degrees and the angle of divergence of said field of view is also less than 15 degrees.

4. A camera for the inspection of the inside wall of a pipe comprising a generally tubular cover having opposite axially directed leading and trailing ends, a camera in said cover having an optical lens displaced rearwardly from the leading end of said cover, means at the leading end of said cover defining a circular viewing aperture concentric to the axis of the lens and of such diameter relative to its distance from the lens as to confine the field of view from the lens through the aperture to an angle of less than 30 degrees of forward divergence relative to the lens axis, means defining an annular light source exteriorly of the cover concentric to said axis and said aperture and displaced rearwardly of said aperture, said cover including an opaque portion interposed radially between said light source and said lens and extending forwardly of the light source sufficiently to prevent light from said source from crossing and axis of the lens, and means for confining the light from said annular source to a forwardly diverging pattern, coaxial with the axis of said lens and diverging forwardly therefrom less than 30 degrees, wind-off and wind-on spools for photographic film housed within said tubular cover in operative relationship to said lens, a motor housing supported at the other end of said cover in alignment therewith and of substantially smaller transverse cross section than said tubular cover, whereby to facilitate the movement of said cover and said housing around bends in the pipe, an electric motor in said housing, means in said cover for driving said wind-on spool, and a flexible drive transmitting element operatively connecting said electric motor to said means, means being connected to said camera for urging the same through the pipe.

5. A camera adapted for the inspection of the inside wall of a pipe having bends therein, comprising an elongated hollow body, a lens at one end of the body a light source arranged to direct light ahead of the said lens, means for shielding the light from the said light source from the lens and means preventing any light from said source from crossing the axis of the lens, wind-off and wind-on spools for photographic film housed within said elongated body in operative relationship to said lens, a motor housing supported at the other end of said body in alignment therewith and of substantially smaller transverse cross section than said elongated body, whereby to facilitate the movement of said body and said housing around bends in the pipe, an electric motor in said housing, means in said body for driving said wind-on spool, and a flexible drive transmitting element operatively connecting said electric motor to said means, means being connected to said camera for urging the same through the pipe.

References Cited by the Examiner

UNITED STATES PATENTS

| 2,667,109 | 1/1954 | Piety | 95—11 |
| 2,737,864 | 3/1956 | Gutterman | 95—11 |

FOREIGN PATENTS 912,046   5/1954   Germany.

JOHN M. HORAN, *Primary Examiner.*